United States Patent [19]

Stevens et al.

[11] 4,403,145
[45] Sep. 6, 1983

[54] CALIBRATION WITH DOUBLE-PASS MEASUREMENTS AND COMPUTATIONAL PEAK FINDING

[75] Inventors: William M. Stevens, Loveland; William E. Atkinson; William J. Dirr, Jr., both of Cincinnati, all of Ohio

[73] Assignee: Randam Electronics, Inc., Cincinnati, Ohio

[21] Appl. No.: 200,887

[22] Filed: Oct. 27, 1980

[51] Int. Cl.³ .......................... G01B 18/00; G01T 1/20
[52] U.S. Cl. .................................. 250/252.1; 250/369
[58] Field of Search ..................... 250/252, 363 S, 369; 73/1 R; 324/98, 140 R, 308, 404; 356/226, 229, 230, 300, 303, 400; 436/8

[56] References Cited

U.S. PATENT DOCUMENTS 4,060,726  11/1977  Luitwieler et al. ................. 250/252

Primary Examiner—Janice A. Howell
Attorney, Agent, or Firm—Eugene F. Friedman

[57] ABSTRACT

A method of calibrating a gamma counter that makes two separate measurements over the peak of the standard source of $I^{129}$ and a computational technique to obtain the center of that peak. A microcomputer controlling the instrument's operation changes the high voltage on the instrument's photomultiplier (PM) tube to find the setting which generally brings the $I^{129}$ peak into the range of the preset pulse height analyzer (PHA) window. Each measurement in the first pass takes a relatively short period of time and looks for the arbitrarily defined end points of the peak. The microcomputer temporarily defines the midpoint of this range as the location of the $I^{129}$ peak. In the second pass, the instrument takes longer measurements, for greater accuracy, at six points on either side of the temporary peak. The microcomputer then curve-fits a first line to the logarithms of the counts obtained at the six points on one side of the temporary peak and a second line to the six points on the other side of the peak. The intersection of the two lines then represents the actual center of the $I^{129}$ peak. To bring another peak within the PHA's window, the instrument alters the voltage on the PM tube from the $I^{129}$ peak just determined.

20 Claims, 2 Drawing Figures

CALIBRATION WITH DOUBLE-PASS MEASUREMENTS AND COMPUTATIONAL PEAK FINDING

BACKGROUND

Most analytical instruments require some degree of calibration to assure the reliability of their measurements and results. Generally, most such instruments undergo this calibration through the use of a standard sample having a known value of the parameter under study by that instrument.

Some analytical instruments only require very infrequent calibration. In fact, the calibration effected upon the building of the instrument may suffice for all of its life in normal wear. Maintaining the instrument in calibration, clearly, does not present a major problem for the instrument's user.

Other instruments do not share this good fortune. The components establishing the correct parameters for proper performance of analyses possess varying degrees of instability that cause them to change over time. Merely turning the instrument's power off and on may effect an unacceptable degree of change. Accordingly, many instruments require relatively frequent calibration to provide meaningful results.

The problem of frequent calibrations becomes even more severe where relatively unsophisticated personnel operate the equipment. The problem becomes particularly egregious where the tests have medical origins. Any inaccuracy in the results due to improper calibration can deleteriously seriously affect an individual's health.

Accordingly, many instruments have attempted to incorporate some aspect of simplified or even partially automated calibration. A first problem in automated calibration, however, involves the attempt to find the exact peak for a physical event undergoing study. In fact, locating the center of the peak becomes excrutiatingly difficult when under non-human control. Particularly does this occur where more than a single phenomenon provides a double peak or a peak with a shoulder.

A second difficulty with automated calibration involves performing the task within a reasonable amount of time. The instrument must scan a large range of possible values of the involved parameter in order to find the peak. Performing the process rapidly results in spending very little time at each value of the parameter and thus leaves a large uncertainty in the results. Taking a long time to conduct the analysis to achieve the requisite accuracy often results in an extraordinarily slow process taking an unacceptable amount of time.

U.S. Pat. No. 4,060,726 to S. H. Luitwieler et al. shows a scheme which attempts to calibrate an instrument over several different energy ranges. The patent employs two PHA's. It sets one with a large window to cover a large range below the desired energy setting and the second with a large window to cover the range above the desired setting. The scheme then employs coarse adjustments in an effort to bring the observed peak near the desired setting.

Luitwieler et al. then reduce the magnitude of the voltage adjustments in successive steps until they get to the lowest increment available. This brings the instrument somewhere in the range of the peak. It then decreases the size of the window, discards the second PHA, and utilizes a longer count period. The scheme then increases and decreases the voltage settings by the smallest available amount in an effort to find the maximum count and presumably the center of the peak.

The Luitwieler et al. scheme requires two PHA's, several adjustments in the windows and voltages, and results in a degree of uncertainty for a sample that does not have a perfectly sharp peak. Accordingly, it does not solve the two problems associated with automatic calibration discussed above.

SUMMARY

The speed and the accuracy of a calibration both improve if the instrument undertakes two excursions through the spectrum of the involved physical parameter. The first pass represents an exploratory investigation to find the general region of the spectrum where the peak of the known sample lies. Each of the measurements in this first pass requires a minimal duration since they do not provide the basis for the final calibration; they only "find" the general region of the peak.

The second pass provides the actual measurements on which to base the final calibration. However, the second group of measurements does not extend across the entire spectrum since the first pass found the peak. The second measurements simply provide the accurate information about the peak itself to establish the final calibration.

Thus, the second group of measurements can last a relatively long period of time without contributing substantially to the length of the overall process. This group only includes a very small number of measurements; their duration does not add appreciably to the overall time of calibration. However, the extended measurements in this group do provide the required accuracy for the final determination.

The analytical instrument capable of carrying out calibration schemes incorporating these features includes, of course, a detector. This determines the magnitude of the property of a sample at a predetermined value of a physical parameter upon which that property depends. In the case of radioactivity analyses, the measured property typically constitutes the number of radioactive decays in a unit time. The physical parameter upon which the property depends, of course, is the energy of the particles under investigation. Coupled to the detector, the instrument includes an adjusting device which varies the value of the physical parameter at which the instrument will determine the magnitude of the measured property. This permits the development of the spectrum under investigation. Lastly, the instrument includes an output device which provides the results indicating the magnitude of the determined property at the various values of the parameter.

Making a double pass through the spectrum begins with the detector determining the magnitude of the property under measurement of a known sample. This sample must have a known nonzero magnitude of the property at a known value of the physical parameter. For gamma counters, $I^{129}$ provides a convenient known sample undergoing radioactive decay to produce gamma particles with an energy of 29 KeV.

The adjusting device then changes the value of the physical parameter. The detector continues to determine the magnitude of the property under investigation at the further settings of the parameter.

The first pass in the double-pass calibration scheme continues until it reveals the general location of the known sample's peak. Specifically, the first pass should include a first group of settings of the values of the physical parameter for which the measured property exceeds a predetermined magnitude. Thus, the first pass shows the full portion of the spectrum over which the measured property of the known sample exceeds the predetermined minimal amount. This serves to locate the peak in the spectrum.

The second pass then looks at a specified fewer number of points within the portion of the spectrum at which the peak occurs. The second pass, which extends generally only over the peak itself, then includes fewer settings within the peak itself than did the first pass. However, the average duration of the measurements performed in the second pass lasts longer than the average measurement in the first pass.

The process utilizes the measurements of the second pass to determine the maximum of the known sample's peak. The calibration process ascribes to the peak's maximum thus empirically determined the previously known location of the known sample's peak.

Further, the instrument can save itself substantial time and provide a more accurate result if it does not physically look for the peak's maximum. Many peaks have a relatively flat configuration in the region of their maxima. The instrument can spend substantial time and incur significant uncertainty in trying to find an exact maximum in this region.

Rather, the instrument may simply look at a first set of measured magnitudes of the property. This first set of measurements derives from the second pass through the spectrum and, thus, possesses greater accuracy.

Generally, this first set of measurements comes from a portion of the spectrum. In particular, this first set of points simply lie to one side of the midpoint of the spectral segment over which the entire peak occurs; picking the midpoint between the ends of the peak avoids the necessity of ever having to find the actual "maximum" of the peak. The instrument may then curve-fit a first line to the measured magnitudes in this first set of values.

Similarly, the instrument obtains a second set of measured magnitudes over a second portion of the measured peak. The second set of values should generally lie on the other side of the peak from the first set. Again, conveniently, the second set of the measured magnitudes may simply lie in the other half of the portion of the spectrum over which the peak occurs.

Further, as with the first set of measured magnitudes, the calibration scheme curve-fits a second line to the second set of measured magnitudes. In particular, curve-fitting a line to the logarithms of the measured magnitudes provides accurate results and a reliably determined peak.

Lastly, to actually obtain the peak, the method extends the resulting two straight lines until they intersect. The value of the physical parameter at the pont of intersection constitutes the point of the spectrum at which the maximum of the peak of the measured property occurs.

The instrument may then go to a desired location in the spectrum by starting at the determined maximum of the known sample's peak. Specifically, it must go to a specific point in the spectrum. To do so, it alters the value of the physical parameter from the determined peak of the known sample by an amount by which the desired point differs from the established location of the known sample.

An instrument, to accomplish these techniques automatically, of course, must have the components for doing so. Specifically, it must have a range detector for determining that portion of the spectrum over which the peak occurs. It should then have the capability, through a midpoint selection means, for determining the midpoint of the range of values of the physical parameter over which the peak has a measured value.

When utilizing the curve-fitting technique, it should have the means for selecting the first and second collections of points. The collections must each contain at least three predetermined values of the physical parameter and extend over separate protions of the spectrum over which the peak occurs.

The curve-fitting device must then curve-fit the two lines to the measured magnitudes in the two sets of points and extend the lines until they intersect. The instrument must then ascribe to the intersection of the two lines the known point in the spectrum at which the known sample has its maximum. The use of a microprocessor enables and simplifies the utilization of these techniques.

DETAILED DESCRIPTION

Figure 1:
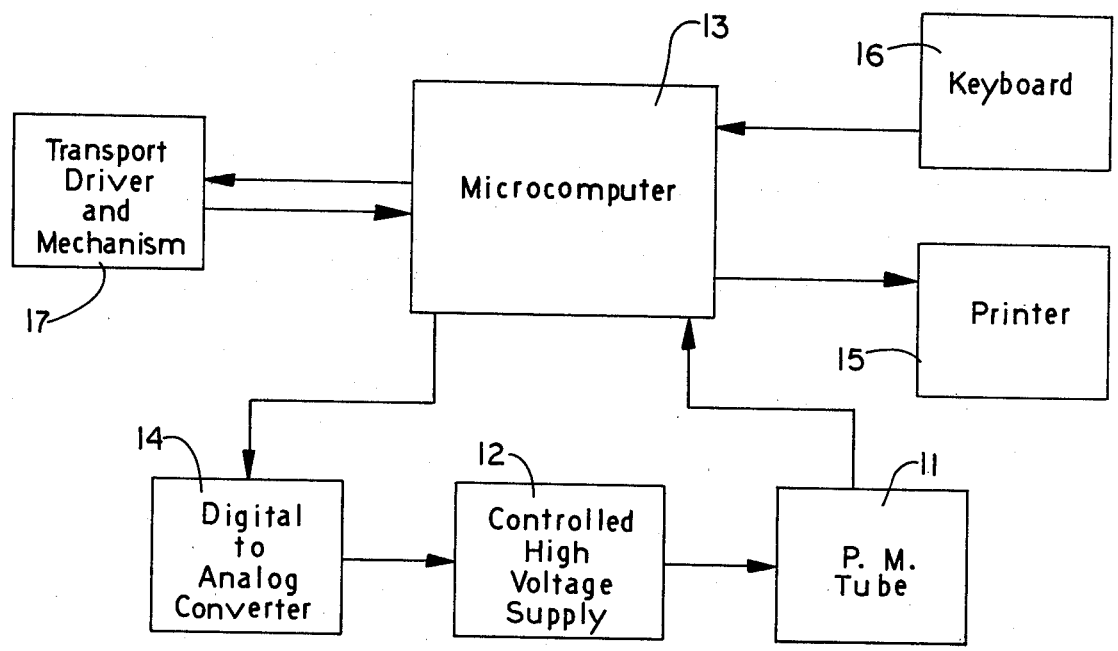
FIG. 1 shows a block diagram of the electrical and electronic components of a gamma counter employing a computational peak-finding technique when calibrating itself.

The instrument diagrammed in FIG. 1 includes the photomultiplier (PM) tube 11 which makes the actual physical measurements on a sample. In particular, it measures the intensity of the light output produced by the substance under study. For a gamma counter, the photomultiplier tube produces electrical pulses having intensities proportional to the energies of the particles.

The intensity of the electrical pulse produced by the photomultiplier tube, however, depends upon the high voltage applied to it as well as the intensity of the light received by it. Accordingly, to provide meaningful results, the photomultiplier tube 11 must have a source of controlled high voltage from the power supply 12.

As mentioned above, the high voltage applied by the power supply 12 determines the magnitude of the output of the PM tube 11 for an input pulse of a particular magnitude. The calibration process determines the exact high voltage that the PM tube 11 must receive to produce an electrical pulse of a determined magnitude when receiving light flashes of known magnitude. To provide these light flashes, the PM tube 11 looks at the radioactive decay of a known sample such as Iodine$^{129}$. The gamma particles produced by the decay of $I^{129}$ have an energy of 29 KeV.

The output from the photomultiplier tube 11 travels to the microcomputer 13. The microcomputer 13 processes the pulses from the PM tube 11 to provide meaningful data. As suggested above, when the PM tube 11 looks at the decay of a known sample, it should provide electrical pulses with a known magnitude to the microcomputer 13. If it does not, the microcomputer 13 provides an output to the digital-to-analog converter (DAC) 14. It attempts to alter the high voltage of the PM tube in a known manner to obtain a proper output from the PM tube 11 when the latter looks at a standard sample. Specifically, the DAC 14 induces a change in the high voltage from the power supply 12 in a direction which will bring the PM tube's output to the desired value.

The microcomputer 13, after it processes the pulses from the PM tube 11, indicates the number of particles counted within a predetermined period of time. Alternatively, it can determine the amount of time required to count a predetermined number of particles. In either event, the microcomputer 13 provides the information it obtains to the printer 15 which displays the results to the operator.

The operator maintains control over the operation of the instrument in FIG. 1 by communicating with the microcomputer 13. The keyboard 16 constitutes the terminal in this instrument through which the operator directs the instrument's operation.

To permit its automatic calibration, the instrument must have a standard source with a known output. Additionally, this source must remain available for the instrument's use at the predetermined times for the self calibration. Further, the transport mechanism 17 carries the standard source from its storage location to the detector at the photomultiplier tube 11 whenever the instrument should calibrate itself. Accordingly, the communication path from the microcomputer 13 to the mechanism 17 causes the latter to actually transport the sample source to the PM tube 11 at the appropriate times.

Additionally, the transport mechanism 17 communicates its position to the microcomputer 13. This allows the latter to effectively control the movement of the former and thus the standard sample source. Also, it informs the microcomputer of its position and, in particular, when it has accomplished its task of moving the standard source to the appropriate location. This allows the microcomputer 13 to continue the operation of the instrument's other components.

The above discussion has centered upon the components shown in FIG. 1 for the specific purpose of calibrating a gamma counter. It, in particular, has focused upon the use of a standard sample contained within the instrument. However, other components than those illustrated may also suffice for the same purpose. Thus, for example, a temporary display panel of LED's may take the place of the printer 15. Furthermore, the components may have functions in addition to the calibration of the instrument. Thus, for example, the transport driver and mechanism 17 may also carry tubes containing unknown samples from sample trays to the detector at the PM tube 11.

Conveniently, the instrument may undergo a calibration when first turned on. This, of course, results when it first receives its electrical power after being off for a period of time. For the sake of accuracy, a calibration should occur at this time to assure the reliability of the subsequently obtained results.

Additionally, the microcomputer 13 may automatically cause the instrument to calibrate itself each day at a particular preset time. This may occur at a time with usually light activity on the instrument, such as 5:00 a.m.

Figure 2:
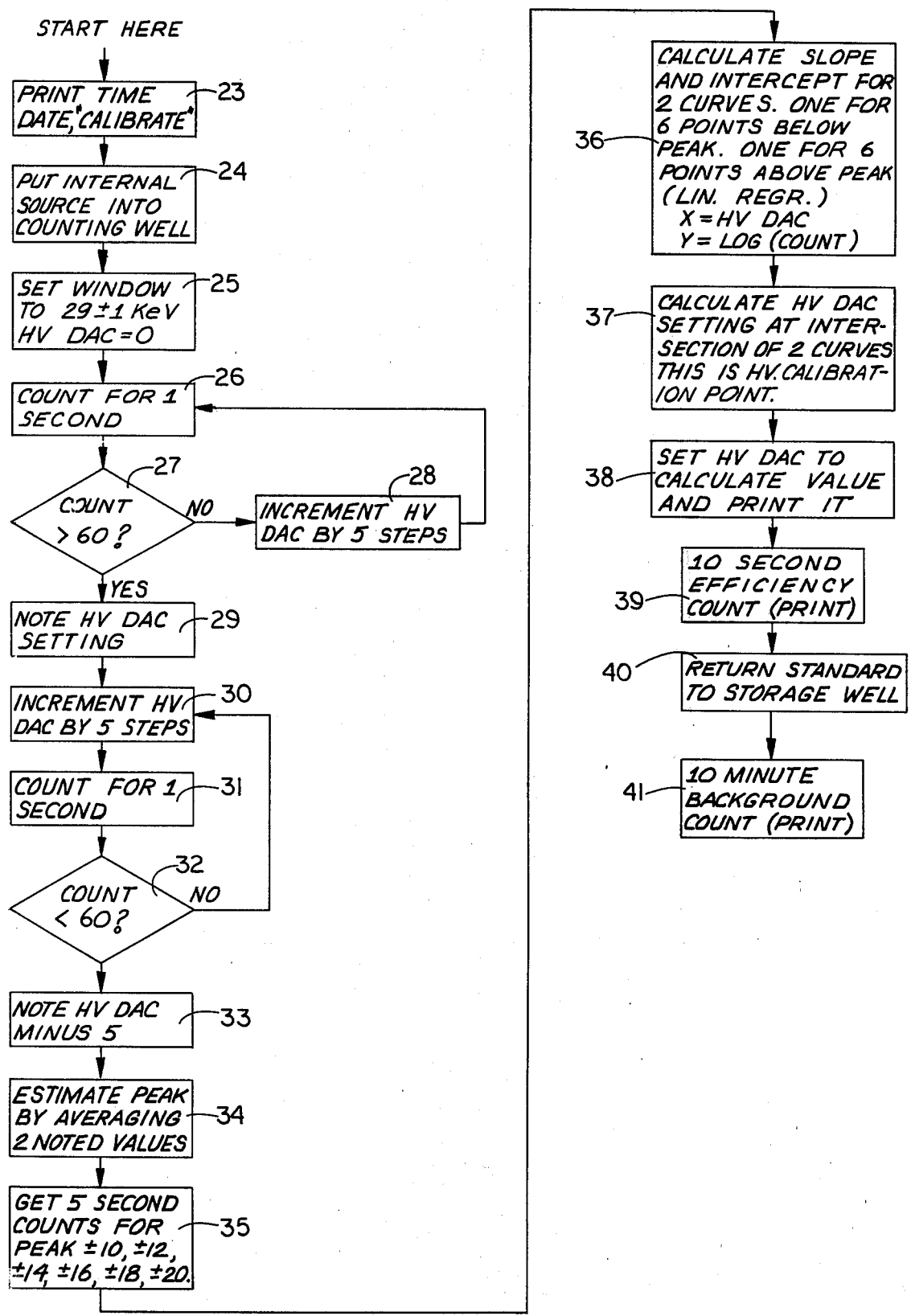
FIG. 2 gives a flow diagram for the program controlling the calibration of the instrument having the components of FIG. 1.

Whichever of the two events causes the instrument to initiate a calibration, the program for doing so appears in FIG. 2. It starts at the box 23 with the printer 15 setting forth the time of day, the date, and the word "CALIBRATE". As the next step, shown in the box 24, the program causes the transport driver and mechanism 17 to move the internal standard source from its holding position to the PM tube 11.

The internal sample incorporates the $I^{129}$ nucleus. This moiety undergoes radioactive decay to produce gamma particles having an energy of 29 Kev.

As part of its interface electronics, the instrument includes a pulse height analyzer (PHA). This permits the counting of particles having an energy falling within a predetermined range or "window". The calibration program segment, in effect, sets this window at 29+1 KeV. In other words, it will allow the counting of particles having an energy from 28 to 30 KeV.

The photomultiplier tube 11 which receives the photons produced by the gamma particles of the sample has an initial voltage of about 800 volts applied to it. The microcomputer 13 increases this voltage on the PM tube 11 through the digital-to-analog converter (DAC) 14. Specifically, the microcomputer causes the DAC to increase the voltage on the photomultiplier tube by anywhere from 1 to 256 DAC units of approximately 1.2 volts each. Thus, the photomultiplier voltage may increase in steps of 1.2 volts from 800 to 1100 volts. The calibration subroutine, at the box 25, initially sets the digital-to-analog converter 14 to zero so that the photomultiplier experiences about 800 volts.

More accurately speaking, the pulse height analyzer receives approximate settings for the lower and upper limits of its window. At a "convenient" voltage applied to the photomultiplier tube, the range will correspond to 28 to 30 KeV. for the window. The calibration scheme in FIG. 2 ultimately determines the exact setting of the DAC and, thus, the voltage on the PM tube which will result in the previously established limits placed on the PHA creating a window of 28 to 30 KeV. Changing the DAC setting by predetermined amounts will then bring other energy ranges into the PHA's window.

With the initial conditions of the PM tube and the PHA thus established, the program permits, at the box 26, the detector to count the particles from the standard source for one second. Specifically, it counts the particles which, with the photomultiplier having an impressed voltage of about 800 volts, create voltage pulses falling within the PHA's window. As a practical matter, with the photomultiplier tube having an impressed voltage of 800 V., its output, resulting from the $I^{129}$ gamma particles, falls below the PHA's window.

Specifically, the pulse height analyzer will not count a minimum of 60 particles in the one second period in response to the question posed by the diamond 27. As a consequence, the program increases the setting on the DAC by five steps as indicated in the box 28. This tends to increase the magnitude of voltage pulses from the PM tube and bring them closer to the PHA's window. After incrementing the high voltage DAC by five steps, the instrument again counts for one second at the step 26. The procedure continues until the one-second count from the PHA exceeds 60. The routine, at the box 29, notes the high-voltage DAC setting where the count first exceeded 60. This DAC setting indicates the general beginning of the peak from the $I^{129}$ nucleus.

The instrument then begins to look for the end of the $I^{129}$ peak. It does so at the box 30 by again incrementing the DAC setting on the PM tube by five further steps. The instrument, at the step 31, continues its one-second countings. At the end of each such one-second period, the program requires as to whether the PHA count for that period has fallen below 60 at the box 32. If not, the I$^{129}$ peak still falls within the PHA's window.

Looking for the end of the I$^{129}$ peak, the program continues to increase the DAC setting by five further steps, at the box 30, until the one-second count, at the box 31, falls below 60. When that happens, the program at the box 33 notes the particular DAC setting immediately before the setting at which the count fell below 60. This represents the last setting actually within the I$^{129}$ peak.

The instrument then makes a preliminary estimate of the DAC setting which would bring the center of the peak within the PHA window. It does this, at the box 34, by averaging the first DAC value, noted at the box 29, and the last DAC setting, noted at the box 33.

The program then directs the instrument to count for longer periods at selected points on either side of the preliminary peak, which represents the midpoint of the range determined at the box 34. In particular, the DAC selects six points on either side of the range's midpoint. It specifically selects ten, twelve, fourteen, sixteen, eighteen, and twenty DAC units on both sides of this temporary peak. At each of these twelve settings, the program, at the box 35, directs the detector to count for a five-second period.

The measurements at these twelve settings of the DAC will form the basis for determining the actual center of the I$^{129}$ peak. Accordingly, the instrument counts at the settings for the longer period of five seconds to improve the reliability of the results. This compares to the one-second counting period used to obtain the range's estimated midpoint at the boxes 26 and 31.

At the box 36, the program fits a straight line to the six points on one side of the temporary peak. Specifically, it uses the linear regression technique to fit a calculated straight line to the plot of the DAC settings against the log of the number of counts at each such setting. The program, still at the box 36, also curve-fits a straight line to the counts obtained at the six points on the other side of the temporary peak. Of course, it uses the same technique for the six points as on the other half of the range.

The program then determines, at the box 37, the intersection of the two lines determined by the linear regression technique. The intersection of the two curves represents the I$^{129}$ peak and, thus, the high voltage calibration point for the known sample. In other words, the program decides that the DAC setting at the intersection of the two curves represents the peak's actual center for the known I$^{129}$ sample. This DAC setting at the intersection point of the two curves specifically represents the energy of 29 KeV. of the I$^{129}$ nucleus.

After determining the calibration point, the program sets the high voltage DAC to this value. It also prints the value on the printer 15 as stated in the box 38.

To determine that the instrument actually operates properly, the program provides for a ten-second count at the DAC setting determined to lie at the middle of the I$^{129}$ peak. It then, in box 39, prints this particular count. The operator may then determine whether the instrument has demonstrated a satisfactory performance. With the calibration thus completed, the program causes the transport mechanism 17 to return the standard to its holder at the box 40.

The instrument, at the box 41, performs a ten-minute background count with no sample holder in the detector well. However, the program may bring the transport mechanism to the well and place it in the position it occupies when it holds a sample holder within the well. Thus, any radioactive material that may have accidentally spilled on the mechanism constitutes part of the background count. This, of course, accords with the configuration the instrument occupies when it actually counts a sample. The background count is subsequently subtracted from an assay count to give a result for the sample free of background interference.

Accordingly, what is claimed is:

1. A method of calibrating an analytical instrument having detector means for determining the magnitude of a property of a sample at a predetermined value of a physical parameter upon which said property depends, adjusting means, coupled to said detector means, for varying the value of said parameter at which said detector means will determine said magnitude of said property, and output means, coupled to said detector means, for indicating said magnitude of said property at various predetermined values of said parameter, said method comprising:

(A) determining at one setting of said value of said parameter, with said detector means, the magnitude of said property of a known sample having a known, nonzero magnitude of said property at a first predetermined value of said parameter;

(B) varying, with said adjusting means, said value of said parameter to further settings;

(C) determining, at said further settings of said value, the magnitude of said property;

(D) continuing to vary said value of said parameter and determining the magnitude of said property of said known sample until said magnitude has been determined at settings of said value extending across the range of said value of said parameter over which the magnitude of said property exceeds a predetermined magnitude;

(E) curve-fitting a first line to a first set of measured magnitudes of said property, the values of said parameter for said first set of measured magnitudes falling within a first portion of said range, curve fitting a second line to a second set of measured magnitudes of said property, the values of said parameter for said second set of measured magnitudes falling within a second portion of said range separate from said first portion, and extending said first and second lines until they intersect at a second value of said physical parameter; and (F) placing, with said adjusting means, said value of said parameter to a desired value of said parameter by varying with said adjusting means the value of said parameter to a third value which differs from said second value by an amount by which said desired value differs from said first value.

2. The method of claim 1 wherein said first portion of said range extends from one end of said range to the midpoint of said range and said second portion of said range extends from said midpoint of said range to the other end of said range.

3. The method of claim 2 wherein the values of said parameter of said first set of measured magnitudes includes a first selected value differing from the midpoint value at said midpoint of said range by a first predetermined amount, a second selected value differing from said first value by a second predetermined amount, and a third selected value differing from said second selected value by said second predetermined amount and the values of said parameter for said second set of measured magnitudes includes a fourth selected value differing from said midpoint value by said first predetermined amount, a fifth selected value differing from said fourth selected value by a second predetermined amount, and a sixth selected value differing from said fifth selected value by said second predetermined amount.

4. The method of claim 1 wherein said first line is the least-squares straight line fit to the logarithms of said first set of measured magnitudes of said property and said second line is the least-squares straight line fit to the logarithms of said second set of measured magnitudes.

5. The method of claim 4 wherein:
(a) said first portion of said range extends from one end of said range to the midpoint of said range and said second portion of said range extends from said midpoint of said range to the other end of said range; and
(b) the values of said parameter of said first set of measured magnitudes includes a first selected value differing from said midpoint value at the midpoint of said range by a first predetermined amount, a second selected value differing from said first selected value by a second predetermined amount, and a third selected value differing from said second selected value by said second predetermined amount and the values of said parameter for said second set of measured magnitudes includes a fourth value differing from said midpoint value by said first predetermined amount, a fifth selected value differing from said fourth selected value by said second predetermined amount, and a sixth selected value differing from said fifth selected value by said second predetermined amount.

6. The method of claim 5 wherein said instrument is a radiation analysis instrument, said property of a sample is the number of alpha, beta, or gamma particles given off by said sample over a predetermined period of time, and said physical parameter is the energy of said particles.

7. The method of claim 6 wherein said settings of said value is a first group of settings of said value and, after determining the magnitude of said property of said sample until said magnitude has been determined for a first predetermined period of time at each of said first group of settings, the magnitude of said property of said sample is determined for a second period of time at sufficient settings in a second group of settings of said value of said parameter within said range to permit a determination of a maximum over said range of the magnitude of said property, said second group having fewer settings within said range than said first group and said second predetermined period of time of the determinations at each setting in said second set lasting longer than said first predetermined time of the determinations of the magnitude of said property at said first set.

8. The method of claim 7 including, prior to determining with said detector means the magnitude of said property at said one setting of said value of said parameter, the step of establishing a maximum and a minimum energy of particles which said detector means will count.

9. The method of claim 8 wherein said known nonzero magnitude of said property is a decay of a first atomic nucleus in said known sample and said first predetermined value is a first energy and said desired value of said parameter is the energy of decay of a second atomic nucleus different than said first atomic nucleus.

10. A method of calibrating an analytical instrument having detector means for determining the magnitude of a property of a sample at a predetermined value of a physical parameter upon which said property depends, adjusting means, coupled to said detector means, for varying said value of said parameter at which said detector means will determine said magnitude of said property, and output means for indicating said magnitude of said property at various values of said parameter, said method comprising:
(A) determining, with said detector means, at a first setting of said value of said parameter, the magnitude of said property of a sample having a known, nonzero magnitude of said property at a first predetermined value of said parameter;
(B) varying, with said adjusting means, said value of said parameter to further settings;
(C) determining, at said further settings of said value, the magnitude of said property;
(D) continuing to vary said value of said parameter and determining the magnitude of said property of said known sample until said magnitude has been determined at a first group of settings of said value extending across the range of said values of said parameter over which the magnitude of said property exceeds a predetermined magnitude;
(E) after determining the magnitude of said property at said first group of settings of said value, determining the magnitude of said property of said known sample at a second group of settings of said value of said parameter within said range, said second group having fewer settings within said range than said first group but sufficient settings to permit a predetermination of a maximum, over said range, of the magnitude of said property, the average duration of the determinations at said values in said second group being longer than the average duration of the determinations at said values in said first group;
(F) determining the particular second value at which occurs the maximum, over said range, of the magnitude of said property; and
(G) placing, with said adjusting means, said value of said parameter to a desired third value of said parameter by varying, with said adjusting means, the value of said parameter to a fourth value which differs from said second value by an amount by which said third value differs from said first value.

11. The method of claim 10 further including the step of curve-fitting a least-squares straight line to the logarithms of a first set of measured magnitudes of said property determined over a first portion of said second group of settings of said value and curve-fitting a least-squares straight line to the logarithms of a second set of measured magnitudes determined over a second portion of said second group of settings of said value.

12. The method of claim 11 wherein said instrument is a radiation analysis instrument, said property of a sample is the number of alpha, beta, or gamma particles given off by said sample over a predetermined period of time, and said physical parameter is the energy of said particles.

13. The method of claim 12 wherein the duration of each of the determinations at the settings in said second group lasts longer than all of the durations of the determinations at the settings in said first group.

14. The method of claim 12 wherein:
(A) said first portion of said range extends from one end of said range to the midpoint of said range and said second portion of said range extends from said midpoint to the other end of said range; and (B) the values of said parameter of said first set of measured magnitudes includes a first selected value differing from said midpoint value at the midpoint of said range by a first predetermined amount, a second selected value differing from said first selected value by a second predetermined amount, and a third selected value differing from said second selected value by said second predetermined amount and the values of said parameter for said second set of measured magnitudes includes a fourth selected value differing from said midpoint value by said first predetermined amount, a fifth selected value differing from said fourth selected value by said second predetermined amount, and a sixth selected value differing from said fifth selected value by said second predetermined amount.

15. The method of claim 14 wherein said known nonzero magnitude of said property is the decay of a first atomic nucleus in said known sample and said first predetermined value is a first energy and said desired third value of said parameter is the energy of decay of a second atomic nucleus different than said first atomic nucleus.

16. The method of claim 15 including, prior to determining, with said detector means the magnitude of said property at said first predetermined value, the step of establishing a maximum and a minimum energy of the particles which said detector means will count.

17. In an analytical instrument having detector means for determining the magnitude of a property of a sample at a predetermined value of a physical parameter upon which said property depends, adjusting means, coupled to said detector means, for varying the value of said parameter at which said detector means will determine said magnitude of said property, and output means, coupled to said detector means, for indicating said magnitude of said property at various predetermined values of said parameter, the improvement of a calibrator comprising:

(A) range detecting means coupled to said detector means, for determining the range, between first and second end points, of said values over which said magnitude of said property of a sample having a known, nonzero magnitude of said property at a first predetermined value of said parameter exceeds a predetermined magnitude;

(B) midpoint selection means, coupled to said range detecting means, for determining the midpoint of said range;

(C) curve-fitting means for:
  (a) selecting a first collection and a second collection of at least three predetermined values each over a first and a second portion, respectively, between said first and said second end points and said midpoint;
  (b) curve-fitting a first line to a first set of magnitudes of said physical property measured at the values of said first collection and a second line to a second set of the magnitudes of said physical property measured at the values in said second collection; and
  (c) extending said first and second lines until they intersect at a second value of said physical parameter; and (D) controller means, coupled to said adjusting means, for causing said adjusting means, when a third value of said parameter is desired, to vary the value of said parameter to a fourth value which differs from said second value by an amount by which said third value differs from said first value.

18. The improvement of claim 17 wherein said curve-fitting means fits, for said first line, the least-squares straight line to the logarithms of said first set of measured magnitudes of said property and fits, for said second line, the least-squares straight line to the logarithms of said second set of measured magnitudes.

19. The improvement of claim 18 wherein said first and second collections of said settings of said value is a first group of settings of said value and said range detecting means is also for, before said curve-fitting means selects said first group of settings, determining the magnitude of said property of said sample at a second group of settings of said value of said parameter over at least said range, said second group having more settings within said range than said first group and the period of time of the determinations at each setting in said first group lasting longer than the time of the determinations of the magnitude of said property at the settings in said second group.

20. The improvement of claim 19 further including limiting means for establishing a maximum and a minimum energy of the particles which said detector means will count.

* * * * *